United States Patent
Candelore

(10) Patent No.: US 7,242,773 B2
(45) Date of Patent: Jul. 10, 2007

(54) MULTIPLE PARTIAL ENCRYPTION USING RETUNING

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 777 days.

(21) Appl. No.: 10/273,904

(22) Filed: Oct. 18, 2002

(65) Prior Publication Data

US 2004/0047470 A1    Mar. 11, 2004

Related U.S. Application Data

(60) Provisional application No. 60/409,675, filed on Sep. 9, 2002.

(51) Int. Cl.
*H04N 7/167* (2006.01)

(52) U.S. Cl. .................. 380/240; 380/210; 380/214; 380/200

(58) Field of Classification Search ............... 713/163; 380/28, 240, 200, 210

See application file for complete search history.

(56) References Cited

U.S. PATENT DOCUMENTS

| | | |
|---|---|---|
| 3,852,519 A | 12/1974 | Court |
| 4,712,238 A | 12/1987 | Gilhousen et al. |
| 4,739,510 A | 4/1988 | Jeffers et al. |
| 4,914,515 A | 4/1990 | Van Luyt |
| 4,944,006 A | 7/1990 | Citta et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |

(Continued)

FOREIGN PATENT DOCUMENTS

EP    0471373    2/1992

(Continued)

OTHER PUBLICATIONS

Liu, et al. Motion Vector Encryption in Multimedia Streaming, 2004, IEEE, pp. 64-71.

(Continued)

*Primary Examiner*—Nasser Moazzami
*Assistant Examiner*—Fikremariam Yalew
(74) *Attorney, Agent, or Firm*—Miller Patent Services; Jerry A. Miller

(57) ABSTRACT

A partial dual encryption encoder, consistent with certain embodiments of the present invention receives video from a source of an unencrypted digital video signal. A first segment of the unencrypted digital video signal is selected for transmission over a first channel. A first encrypter encrypts a second segment of the unencrypted digital video signal under a first encryption method to produce a first encrypted segment and a second encrypter that encrypts the second segment of the unencrypted digital video signal under a second encryption to produce a second encrypted segment. A multiplexer combines the unencrypted digital video signal with the first and second encrypted segments for transmission, so that the first segment is transmitted over a first channel, the first encrypted segment is transmitted over the first channel and the second encrypted segment is transmitted over a second channel. A trigger message generator generates a trigger message indicating that the second encrypted segment of the digital video signal will be encrypted and will be transmitted on a second channel. The multiplexer further combines the trigger message with the first segment, the first encrypted segment and second encrypted segment.

61 Claims, 6 Drawing Sheets

U.S. PATENT DOCUMENTS

| | | |
|---|---|---|
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,999,622 A * | 12/1999 | Yasukawa et al. ............ 705/51 |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A * | 5/2000 | Guralnick et al. .......... 380/240 |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,138,237 A | 10/2000 | Ruben et al. |
| 6,148,082 A | 11/2000 | Slattery et al. |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,204,843 B1 | 3/2001 | Freeman et al. |
| 6,209,098 B1 | 3/2001 | Davis |

| | | | | | |
|---|---|---|---|---|---|
| 6,215,484 B1 | 4/2001 | Freeman et al. | 2002/0126800 A1 | 9/2002 | Katayama et al. |
| 6,226,618 B1 | 5/2001 | Downs et al. | 2002/0126890 A1 | 9/2002 | Katayama et al. |
| 6,229,895 B1 | 5/2001 | Son et al. | 2002/0129243 A1 | 9/2002 | Nanjundiah |
| 6,230,194 B1 | 5/2001 | Frailong et al. | 2002/0150239 A1* | 10/2002 | Carny et al. ................ 380/37 |
| 6,230,266 B1 | 5/2001 | Perlman et al. | 2002/0164022 A1 | 11/2002 | Stasser et al. |
| 6,236,727 B1 | 5/2001 | Ciacelli et al. | 2002/0170053 A1 | 11/2002 | Peterka et al. |
| 6,240,553 B1 | 5/2001 | Son et al. | 2002/0184506 A1* | 12/2002 | Perlman ................... 713/182 |
| 6,246,720 B1 | 6/2001 | Kutner et al. | 2002/0194613 A1 | 12/2002 | Unger |
| 6,256,747 B1 | 7/2001 | Inohara et al. | 2002/0196939 A1 | 12/2002 | Unger et al. |
| 6,263,506 B1 | 7/2001 | Ezaki et al. | 2003/0002854 A1 | 1/2003 | Belknap et al. |
| 6,266,416 B1 | 7/2001 | Sigbjornsen et al. | 2003/0009569 A1 | 1/2003 | White et al. |
| 6,266,480 B1 | 7/2001 | Ezaki et al. | 2003/0012286 A1 | 1/2003 | Ishitiaq et al. |
| 6,272,538 B1 | 8/2001 | Holden et al. | 2003/0021412 A1 | 1/2003 | Candelore et al. |
| 6,278,783 B1 | 8/2001 | Kocher et al. | 2003/0026423 A1 | 2/2003 | Unger et al. |
| 6,289,455 B1 | 9/2001 | Kocher et al. | 2003/0046686 A1 | 3/2003 | Candelore et al. |
| 6,292,568 B1 | 9/2001 | Atkins, III et al. | 2003/0059047 A1 | 3/2003 | Iwamura |
| 6,292,892 B1 | 9/2001 | Davis | 2003/0063615 A1 | 4/2003 | Luoma et al. |
| 6,307,939 B1 | 10/2001 | Vigarie | 2003/0072555 A1 | 4/2003 | Yap et al. |
| 6,311,012 B1 | 10/2001 | Cho et al. | 2003/0077071 A1 | 4/2003 | Lin et al. |
| 6,324,288 B1 | 11/2001 | Hoffman | 2003/0081630 A1 | 5/2003 | Mowery et al. |
| 6,351,538 B1 | 2/2002 | Uz | 2003/0081776 A1 | 5/2003 | Candelore |
| 6,378,130 B1 | 4/2002 | Adams | 2003/0084284 A1 | 5/2003 | Ando et al. |
| 6,389,533 B1 | 5/2002 | Davis et al. | 2003/0112333 A1 | 6/2003 | Chen et al. |
| 6,389,537 B1 | 5/2002 | Davis et al. | 2003/0118243 A1 | 6/2003 | Sezer et al. |
| 6,415,031 B1 | 7/2002 | Colligan et al. | 2003/0123664 A1 | 7/2003 | Pedlow, Jr. et al. |
| 6,415,101 B1 | 7/2002 | deCarmo et al. | 2003/0123849 A1 | 7/2003 | Nallur et al. |
| 6,430,361 B2 | 8/2002 | Lee | 2003/0126086 A1 | 7/2003 | Safadi |
| 6,445,738 B1 | 9/2002 | Zdepski et al. | 2003/0133570 A1 | 7/2003 | Candelore et al. |
| 6,449,718 B1 | 9/2002 | Rucklidge et al. | 2003/0140257 A1 | 7/2003 | Peterka et al. |
| 6,453,115 B1 | 9/2002 | Boyle | 2003/0145329 A1 | 7/2003 | Candelore |
| 6,456,985 B1 | 9/2002 | Ohtsuka | 2003/0152224 A1 | 8/2003 | Candelore et al. |
| 6,459,427 B1 | 10/2002 | Mao et al. | 2003/0152226 A1 | 8/2003 | Candelore et al. |
| 6,463,152 B1 | 10/2002 | Takahashi | 2003/0156718 A1 | 8/2003 | Candelore et al. |
| 6,466,671 B1 | 10/2002 | Maillard et al. | 2003/0159139 A1 | 8/2003 | Candelore et al. |
| 6,505,032 B1 | 1/2003 | McCorkle et al. | 2003/0159140 A1 | 8/2003 | Candelore |
| 6,505,299 B1 | 1/2003 | Zeng et al. | 2003/0159152 A1 | 8/2003 | Lin et al. |
| 6,510,554 B1 | 1/2003 | Gorden et al. | 2003/0174837 A1 | 9/2003 | Candelore et al. |
| 6,519,693 B1 | 2/2003 | Debey | 2003/0188154 A1 | 10/2003 | Dallard |
| 6,529,526 B1 | 3/2003 | Schneidewend | 2003/0193973 A1 | 10/2003 | Takashimizu et al. |
| 6,543,053 B1 | 4/2003 | Li et al. | 2003/0198223 A1 | 10/2003 | Mack et al. |
| 6,549,229 B1 | 4/2003 | Kirby et al. | 2003/0204717 A1* | 10/2003 | Kuehnel ................... 713/150 |
| 6,587,561 B1 | 7/2003 | Sered et al. | 2003/0226149 A1 | 12/2003 | Chun et al. |
| 6,640,145 B2 | 10/2003 | Hoffberg et al. | 2003/0228018 A1 | 12/2003 | Vince |
| 6,650,754 B2 | 11/2003 | Akiyama et al. | 2004/0003008 A1 | 1/2004 | Wasilewski et al. |
| 6,678,740 B1 | 1/2004 | Rakib et al. | 2004/0010717 A1 | 1/2004 | Simec et al. |
| 6,681,326 B2 | 1/2004 | Son et al. | 2004/0021764 A1 | 2/2004 | Driscoll, Jr. et al. |
| 6,684,250 B2 | 1/2004 | Anderson et al. | 2004/0028227 A1 | 2/2004 | Yu |
| 6,714,650 B1 | 3/2004 | Maillard et al. | 2004/0047470 A1 | 3/2004 | Candelore |
| 6,754,276 B1 | 6/2004 | Harumoto et al. | 2004/0049688 A1 | 3/2004 | Candelore |
| 6,788,690 B2 | 9/2004 | Harri | 2004/0049690 A1 | 3/2004 | Candelore et al. |
| 6,826,185 B1 | 11/2004 | Montanaro et al. | 2004/0049691 A1 | 3/2004 | Candelore et al. |
| 6,891,565 B1 | 5/2005 | Dieterich | 2004/0049694 A1 | 3/2004 | Candelore |
| 6,895,128 B2 | 5/2005 | Bohnenkamp | 2004/0068659 A1 | 4/2004 | Diehl |
| 6,904,520 B1 | 6/2005 | Rosset et al. | 2004/0078575 A1 | 4/2004 | Morten et al. |
| 6,917,684 B1 | 7/2005 | Tatebayashi et al. | 2004/0081333 A1 | 4/2004 | Grab et al. |
| 6,938,162 B1 | 8/2005 | Nagai et al. | 2004/0091109 A1 | 5/2004 | Son et al. |
| 6,976,166 B2* | 12/2005 | Herley et al. ................ 713/165 | 2004/0100510 A1 | 5/2004 | Milic-Frayling et al. |
| 7,039,938 B2 | 5/2006 | Candelore | 2004/0136532 A1 | 7/2004 | Pinder et al. |
| 7,065,213 B2 | 6/2006 | Pinder | 2004/0139337 A1 | 7/2004 | Pinder et al. |
| 7,127,619 B2 | 10/2006 | Unger et al. | 2004/0165586 A1 | 8/2004 | Read et al. |
| 2001/0030959 A1 | 10/2001 | Ozawa et al. | 2004/0187161 A1 | 9/2004 | Cao |
| 2001/0036271 A1 | 11/2001 | Javed | 2004/0193550 A1 | 9/2004 | Siegal |
| 2001/0051007 A1 | 12/2001 | Teshima | 2004/0240668 A1 | 12/2004 | Bonan et al. |
| 2002/0003881 A1 | 1/2002 | Reitmeier et al. | 2004/0267602 A1 | 12/2004 | Gaydos et al. |
| 2002/0026587 A1 | 2/2002 | Talstra et al. | 2005/0004875 A1 | 1/2005 | Kontio et al. |
| 2002/0046406 A1 | 4/2002 | Chelehmal et al. | 2005/0066357 A1 | 3/2005 | Ryal |
| 2002/0047915 A1 | 4/2002 | Misu | 2005/0071669 A1 | 3/2005 | Medvinsky et al. |
| 2002/0059425 A1 | 5/2002 | Belfiore et al. | 2005/0169473 A1 | 8/2005 | Candelore |
| 2002/0083317 A1 | 6/2002 | Ohta et al. | 2005/0192904 A1 | 9/2005 | Candelore |
| 2002/0083438 A1 | 6/2002 | So et al. | 2005/0259813 A1 | 11/2005 | Wasilewski et al. |
| 2002/0097322 A1 | 7/2002 | Monroe et al. | 2005/0265547 A1 | 12/2005 | Strasser et al. |
| 2002/0108035 A1 | 8/2002 | Herley et al. | 2006/0136975 A1 | 6/2006 | Coupe et al. |
| 2002/0116705 A1 | 8/2002 | Perlman et al. | | | |

| | | |
|---|---|---|
| 2006/0136976 A1 | 6/2006 | Coupe et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

Anonymous, New Digital Copy Protection Proposal Would Secure Authorized Copies, PR Newswire, Nov. 1998, pp. 1-3.
Allattar, A.M. et al., Improved selective encryption techniques for secure transmission of MPEG video bitstreams, Oct. 24, 1999, Digimarc Corp., Lake Oswego, OR, USA, IEEE, pp. 256-260.
Kunkelmann T. et al., A scalable security architecture for multimedia communication standards, Darmstard Univ. of Technology, ITO, Germany, 1997, pp. 660-661.
Yip, Kun-Wah, Partial-encryption technique for intellectual property protection of FPGA-Based products, Dec. 15, 1999, IEEE, pp. 183-190.
International Search Report for application No. PCT/US2004/032228.
Anonymous, Message Authentication with Partial Encryption, Research disclosure RD 296086, Dec. 10, 1988.
"Performance Study of a Selective Encryption Scheme for the Security of Networked, Real-Time Video" by Spanos and Maples, pp. 2-10, 1995, IEEE.
"An Empirical Study of Secure MPEG Video Transmissions" by Agi and Gong, pp. 137-144, 1996, IEEE, Proceedings of SNDSS '96.
"Selective Encryption and Watermarking of MPEG Video (Extended Abstract)" by Wu and Wu, Feb. 17, 1997, submitted to International Conference on Image Science, Systems, and Technology, CISST'97.
"Run-Time Performance Evaluation for a Secure MPEG System Supporting Both Selective Watermarking and Encryption" by Wu and Wu, Mar. 1, 1997, submitted to JSAC spacial issue on Copyright and Privacy Protection.
"DVD Demystified—The Guidebook for DVD-Video and DVD-ROM" by Jim Taylor, Pub. McGraw-Hill, 1998, ISBN: 0-07-064841-7, pp. 134-147.
"An Efficient MPEG Video Encyption Algorithm" by Shi and Bhargava, pp. 381-386, 1998 IEEE.
"Multimedia and Security Workshop at ACM Multimedia" '98. Bristol, U.K., Sep. 1998.
"Comparison of MPEG Encryption Algorithms", by Qiao and Nahrstedt, Jan. 17, 1998, Preprint submitted to Elsevier Science.
"Applying Encryption to Video Communication" by Kunkelmann, pp. 41-47, Sep. 1998, Multimedia and Security Workshop at ACM Multimedia '98. Bristol, U.K.
"Evaluation of Selective Encryption Techniques for Secure Transmission of MPEG-Compressed Bit-Streams" by Alattar and Al-Regib, pp. IV-340 to IV-343, 1999, IEEE.
"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.
"Transport Streams Insertion of Video in the Compressed Digital Domain" by SeaChange International, Web Site Literature, 2000.
"A Report on Security Issues in Multimedia" by Gulwani, Apr. 30, 2000, Course Notes, Department of Computer Science and Engineering, Indian Institute of Technology Kanpur.
"Fast Encryption Methods for Audiovisual Data Confidentiality" by Wu and Kuo, Nov. 2000, SPIE International Symposia on Information Technologies 2000, (Boston, Ma., USA).
"Visible World—A High Impact Approach to Customized Television Advertising" by Haberman, Dec. 2001.
"Ad Agencies and Advertisers To Be Empowered with Targeted Ads Delivered by Television's Prevailing Video Servers" Article Business Section of The New York Times, Updated Thursday, Dec. 20, 2001.
"Pre-Encryption Profiles—Concept Overview and Proposal", Rev. 1.2 as submitted to the Open CAS consortium on Dec. 28, 2000.
"Dynamic-Customized TV Advertising Creation and Production Tools" by SeaChange International, Web Site Literature.
U.S. Appl. No. 10/038,217, filed Jan. 2, 2002, Critical Packet Partial Encryption.
U.S. Appl. No. 10/038,032, filed Jan. 2, 2002, Time Division Partial Encryption.
U.S. Appl. No. 10/037,914, filed Jan. 2, 2002, Elementary Stream Partial Encryption.
U.S. Appl. No. 10/037,499, filed Jan. 2, 2002, Partial Encryption and PID Mapping.
U.S. Appl. No. 10/037,498, filed Jan. 2, 2002, Decoding and Decryption of Partially Encrypted Information.
U.S. Appl. No. 10/273,905, filed Oct. 18, 2002, Video Slice and Active Region Based Dual Partial Encryption.
U.S. Appl. No. 10/319,133, filed Dec. 13, 2002, Selective Encryption for Video on Demand.
U.S. Appl. No. 10/273,875, filed Oct. 18, 2002, Encryption and Content Control in a Digital Broadcast System.
U.S. Appl. No. 10/084,106, filed Feb. 27, 2002, Reconstitution of Program Streams Split Across Multiple Program Identifiers.
U.S. Appl. No. 10/273,903, filed Oct. 18, 2002, Star Pattern Partial Encryption.
U.S. Appl. No. 10/274,084, filed Oct. 18, 2002, Slice Mask and Moat Pattern Partial Encrytption.
U.S. Appl. No. 10/319,066, filed Dec. 13, 2002, Content Replacement by PID Mapping.
U.S. Appl. No. 10/293,761, filed Nov. 13, 2002, Upgrading of Encryption.
U.S. Appl. No. 10/318,782, filed Dec. 13, 2002, Content Distribution for Multiple Digital Rights Management.
U.S. Appl. No. 10/319,169, filed Dec. 13, 2002, Selective Encryption to Enable Multiple Decryption Keys.
U.S. Appl. No. 10/273,904, filed Oct. 18, 2002, Multiple Partial Encryption Using Retuning.
U.S. Appl. No. 10/319,096, filed Dec. 13, 2002, Abandoned, Selective Encryption to Enable Trick Play.
U.S. Appl. No. 10/391,940, filed Mar. 19, 2003, Selective Encryption to Enable Trick Play.
U.S. Appl. No. 10/303,594, filed Nov. 25, 2002, Progressive Video Refresh Slice Detection.
U.S. Appl. No. 10/274,019, filed Oct. 18, 2002, Video Scene Change Detection.
U.S. Appl. No. 10/393,324, filed Mar. 20, 2003, Auxiliary Program Association Table.
U.S. Appl. No. 10/373,479, Feb. 24, 2003, PID Filter Based Network Routing.
U.S. Appl. No. 10/767,421, filed Jan. 29, 2004, Content Scrambling With Minimal Impact on Legacy Devices.
U.S. Appl. No. 10/662,585, filed Sep. 15, 2003, Decryption System.
U.S. Appl. No. 10/667,614, filed Sep. 22, 2003, Modifying Content Rating.
U.S. Appl. No. 10/634,546, filed Aug. 5, 2003, Variable Perspective View of Video Images.
U.S. Appl. No. 10/822,891, filed Apr. 13, 2004, Macro-Block Based Content Replacement by PID Mapping.

U.S. Appl. No. 10/764,202, filed Jan. 23, 2004, Re-Encrypted Delivery of Video On Demand Content.
U.S. Appl. No. 10/828,737, filed Apr. 21, 2004, Batch Mode Session-based Encryption of Video on Demand Content.
U.S. Appl. No. 10/764,011, Bi-Directional Indices for Trick Mode Video-on-Demand.
U.S. Appl. No. 10/802,084, filed Mar. 16, 2004, Hybrid Storage of Video on Demand Content.
U.S. Appl. No. 10/802,007, filed Mar. 16, 2004, Dynamic Composition of Pre-Encrypted Video on Demand Content.
U.S. Appl. No. 10/774,871, Feb. 9, 2004, Cablecard with Content Manipulation.
U.S. Appl. No. 10/802,008, filed Mar. 16, 2004, Preparation of Content for Multiple Conditional Access Methods in Video on Demand.
U.S. Appl. No. 10/823,431, filed Apr. 13, 2004, Composite Session-Based Encryption of Video on Demand.
U.S. Appl. No. 10/964,267, filed Oct. 13, 2004, Multiple Selective Encryption with DRM.
U.S. Appl. No. 10/763,865, filed Jan. 22, 2004, Method And Apparatus For Securing Control Words.
U.S. Appl. No. 10/387,163, filed Mar. 22, 2003, Method and Apparatus for Protecting the Transfer of Data.
U.S. Appl. No. 10/815,371, filed Mar. 31, 2004, IP Delivery of Secure Digital Content.
U.S. Appl. No. 10/764,682, filed Jan. 23, 2004, System, Method and Apparatus for Secure Digital Content Transmission.
U.S. Appl. No. 10/388,002, filed Mar. 12, 2003, Mechanism for Protecting the Transfer of Digital Content.
U.S. Appl. No. 10/690,192, filed Mar. 12, 2003, Descrambler.
U.S. Appl. No. 10/691,170, filed Oct. 5, 2003, Multi-Process.
U.S. Appl. No. 10/403,834, filed Mar. 31, 2003, System and Method for Partially Encrypted Multimedia System.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
ANONYMOUS, Message Authentication with Partial Encryption, Research discosure RD 296086, Dec. 10, 1998.
ANONYMOUS, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep.1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", Sony Corporation, (1991).
Lakshiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia '03, Nov. 2003.
Menezes, Alfred J., et al., "Handbook of Applied Cryptography", CRC Press, 551-553.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Robert et al., "Digital Cable: The Key to Your Content", Access Intelligence's Cable Group, Feb. 2002, online at http:www.cableworld.com/ct/archives/0202/0202digitalrights.htm.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Zhu, et al., "Coding and Cell-Loss Recovery in DCT-Based Packet Video", IEEE Transactions on Circuits and Systems for Video Technology, No. 3, NY,(Jun. 3, 1993).
"ClearPlay: The Technology of Choice", from web site, ClearPlay 2001-2003.

* cited by examiner

MULTIPLE PARTIAL ENCRYPTION USING RETUNING

CROSS REFERENCE TO RELATED DOCUMENTS

This application is related to patent applications docket number SNY-R4646.01 entitled "Critical Packet Partial Encryption" to Unger et al., Ser. No. 10/038,217; patent applications docket number SNY-R4646.02 entitled "Time Division Partial Encryption" to Candelore et al., Ser. No. 10/038,032; docket number SNY-R4646.03 entitled "Elementary Stream Partial Encryption" to Candelore, Ser. No. 10/037,914; docket number SNY-R4646.04 entitled "Partial Encryption and PID Mapping" to Unger et al., Ser. No. 10/037,499; and docket number SNY-R4646.05 entitled "Decoding and Decrypting of Partially Encrypted Information" to Unger et al., Ser. No. 10/037,498 all of which were filed on Jan. 2, 2002 and are hereby incorporated by reference herein.

This application is also related to and claims priority benefit of U.S. Provisional patent application Ser. No. 60/409,675 filed Sep. 9, 2002 to Candelore, et al. entitled "Generic PID Remapping for Content Replacement", Docket No. 5OS5152, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, in certain embodiments, this invention relates to a multiple encryption method and apparatus particularly useful for multiple encryption of packetized video content such as that provided by cable and satellite television systems.

BACKGROUND OF THE INVENTION

A conventional cable system arrangement is depicted in FIG. 1. In such a system, the cable operator processes audio/video (A/V) content 14 with CA technology from manufacturer A (system A) using CA encryption equipment 18 compliant with system A at the cable system headend 22. The encrypted A/V content 14 along with system information (SI) 26 and program specific information (PSI) 27 is multiplexed together and transmitted over the cable system 32 to a user's Set-top box (STB) or other receiver 36. STB 36 incorporates decrypting CA equipment from system A (manufacturer A) 40 that decrypts the A/V content. The decrypted A/V content can then be supplied to a television set 44 for viewing by the user.

In a cable system such as that of FIG. 1, digital program streams are broken into packets for transmission. Packets for each component of a program (video, audio, auxiliary data, etc.) are tagged with a packet identifier or PID. These packet streams for each component of all programs carried within a channel are aggregated into one composite stream. Additional packets are also included to provide decryption keys and other overhead information. Otherwise unused bandwidth is filled with null packets.

Overhead information usually includes guide data describing what programs are available and how to locate the associated channels and components. This guide data is also known as system information or SI. SI may be delivered to the STB in-band (part of the data encoded within a channel) or out-of-band (using a special channel dedicated to the purpose). Electronically delivered SI may be partially duplicated in more traditional forms—grids published in newspapers and magazines.

Since the encryption process defined by conditional access system A is proprietary to the manufacturer of the STB 36, it is difficult and expensive for a cable operator to utilize alternative sources for this hardware. Consequently, the cable or satellite operator may be locked in to a particular supplier for hardware.

The above-referenced commonly owned patent applications address this issue and therein describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes (STB) or other implementations of conditional access (CA) receivers from multiple manufacturers in a single system—thus freeing the cable or satellite company to competitively shop for providers of Set-top boxes.

In each of these disclosures, the content is carried in the clear using a primary Packet Identifier (PID). A secondary PID is also assigned to the program content. Selected portions of the content are then encrypted under two (or more) encryption systems and the encrypted content transmitted using both the primary and secondary PIDs. The so-called legacy STBs operate in a normal manner decrypting encrypted packets arriving under the primary PID. The newer STBs operate by associating both the primary and secondary PIDs with a single program. Packets with a primary PID are decoded normally and packets with a secondary PID are first decrypted then decoded. The packets associated with both PIDs are then assembled together to make up a single program stream.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
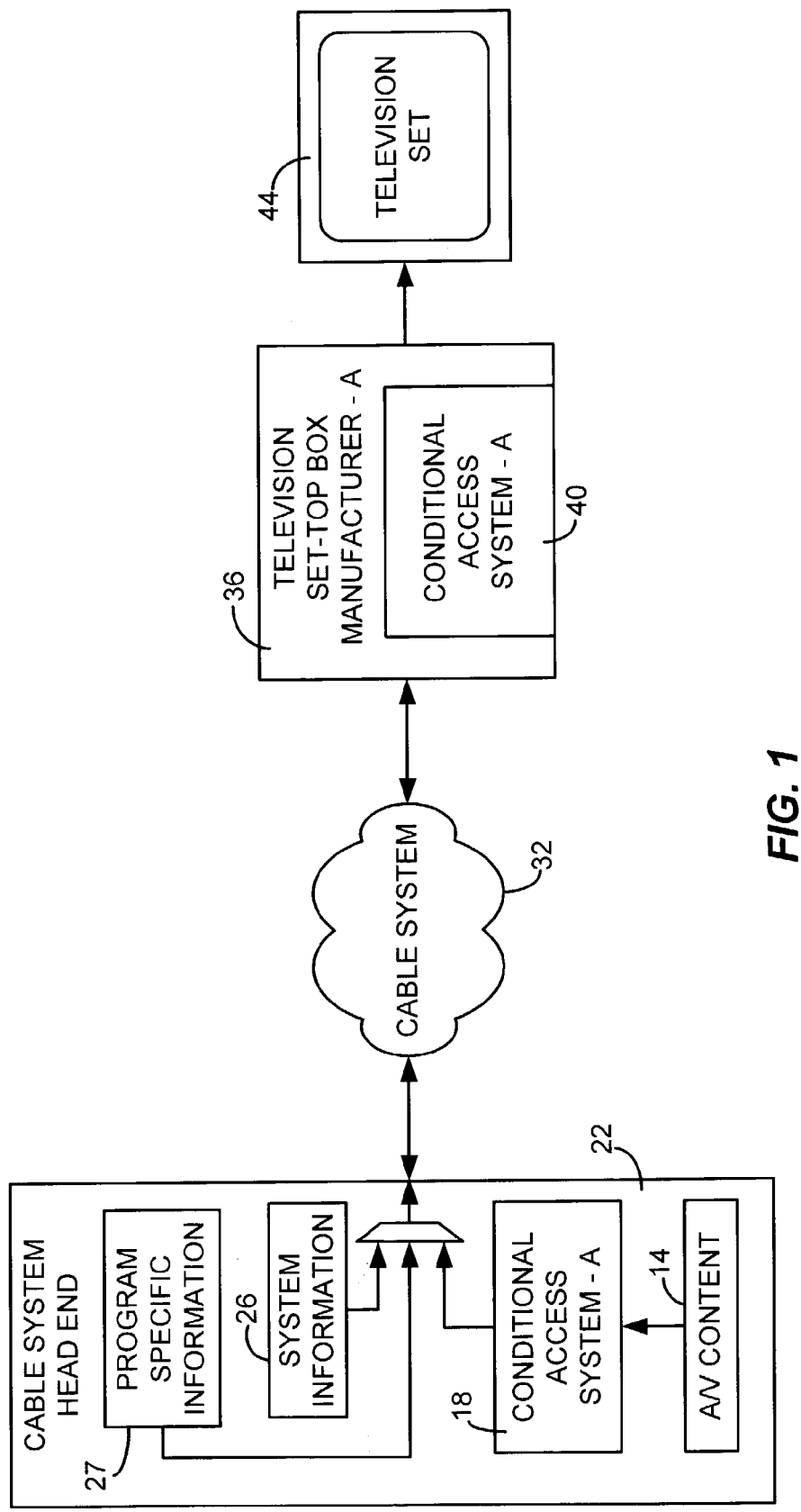
FIG. 1 is a block diagram of a conventional cable television system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Figure 2:
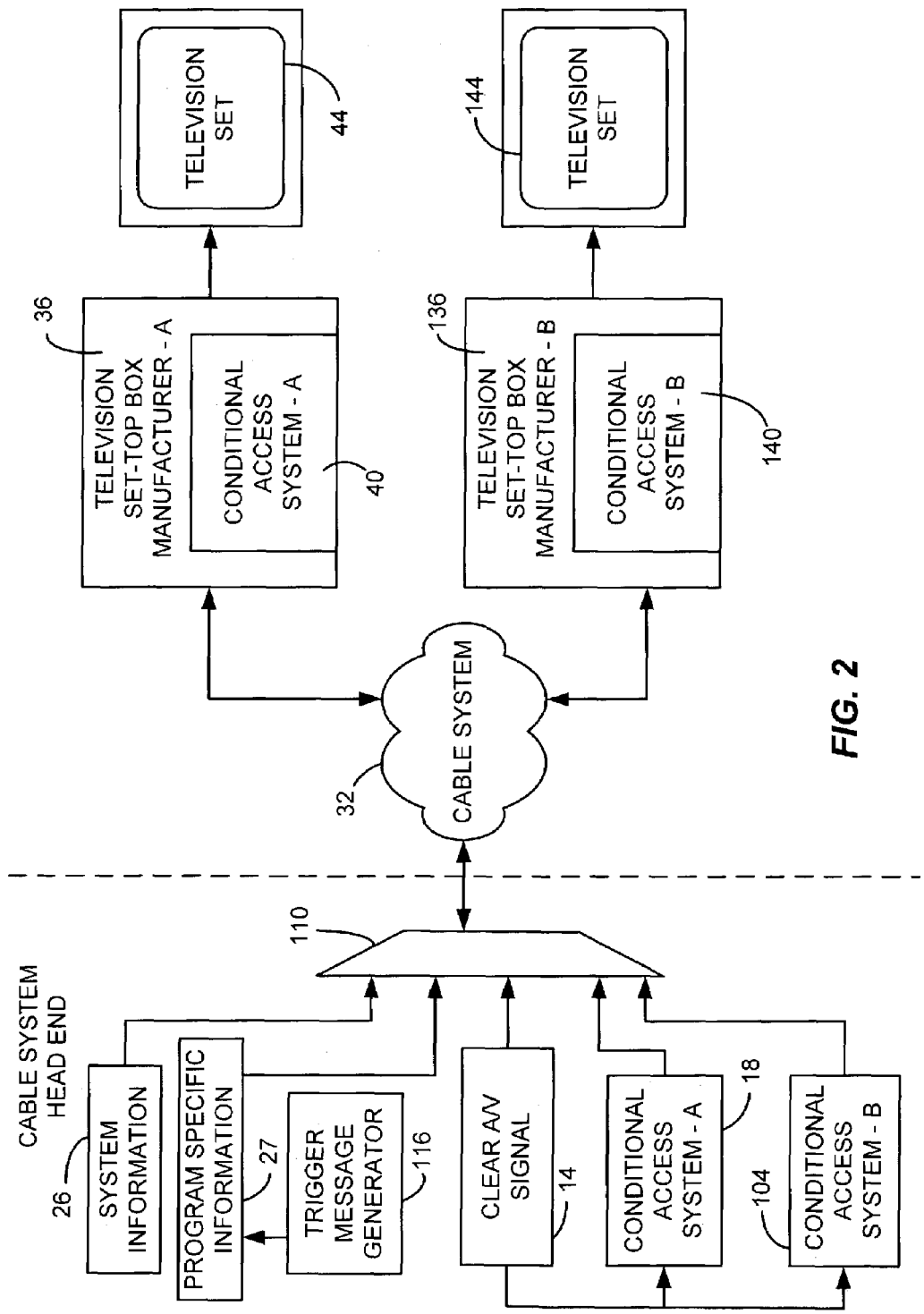
FIG. 2 is block diagram of a dual encrypted cable television system consistent with certain embodiments of the present invention.

Turning now to FIG. 2, a cable television system suitable for use in practicing a dual encryption embodiment of the present invention is illustrated. Those skilled in the art will appreciate that the present invention could also be implemented using more than two encryptions systems without departing from the present invention. The illustrated head end 100 implements the dual partial encryption scenario of the present invention by implementing a retuning to a different channel to accommodate decryption of an encrypted portion of a partially encrypted selection of content.

Head end 100 receives scrambled content from one or more suppliers, for example, using a satellite dish antenna that feeds a satellite receiver (not shown). The satellite receiver operates to demodulate and descramble the incoming content and supplies the content as a stream of clear (unencrypted) data. It is assumed, for purposes of the present embodiment of the invention, that the data from the satellite receiver is supplied as MPEG (Moving Pictures Expert Group) compliant packetized data. This unencrypted (clear) digital television signal 14 is selectively applied to a first conditional access encryption system A 18 as well as to a second conditional access encryption system B 104. Encryption system 18 can be the legacy encryption system used in the conventional single encryption system of FIG. 1. Encryption system 104 can be a new encryption system that is to be added to the cable (or equivalently satellite) television system. The clear A/V signal 14 is also applied to a multiplexer 110 for selective transmission over the cable system as will be described shortly. Encrypted portions of the clear signal 14 as produced by encryption systems 18 and 104 are also selectively applied to multiplexer 110 in accordance with the present invention as will be described. In addition to these signals, system information 26 and program specific information 27 is applied to multiplexer 110.

In accordance with the operation of certain embodiments consistent with the present invention, selected segments of the A/V content are encrypted under both encryption systems 18 and 104. In accordance with any suitable algorithm, segments of the clear A/V content are selected for encryption. Any given selected segment that is to be dual encrypted is duplicated and encrypted by both systems 18 and 104. These selected segments are then inserted at multiplexer 110 into the outbound data stream in place of the corresponding original, unencrypted content. These selected encrypted segments are inserted as content in the same channel as the unencrypted content (channel A) as well as in a second channel (channel B).

When a segment is selected for encryption, a trigger message is generated (e.g., as a user data message in the Program Specific Information (PSI)) by a trigger message generator 116 and transmitted in advance of the encrypted content. This trigger message is used by a Set-top box 136 as a signal that a portion of the upcoming content will be encrypted and will appear on a second channel. Thus, when the STB 136 receives this message it prepares to retune to the second channel (channel B) at a time or packet number prescribed by the trigger message. Thus, at the prescribed time, STB 136 retunes to channel B and uses a decryptor for conditional access system B 140 to decrypt the incoming encrypted segment. In this manner, STB 136 need not comply with the conditional access system A 40 of STB 36 and can thus be supplied by a different manufacturer (avoiding need for a license to conditional access system A). The unencrypted and decrypted A/V signal is then passed to television set 144.

At the legacy STB 36 using conditional access system A 40, a mixture of encrypted and unencrypted packets are received. Conditional access system A decrypter 40 on such systems automatically decrypt that which is encrypted and pass that which is not. Thus, STB 36 operates normally with the dual encryption operating transparently.

Figure 3:
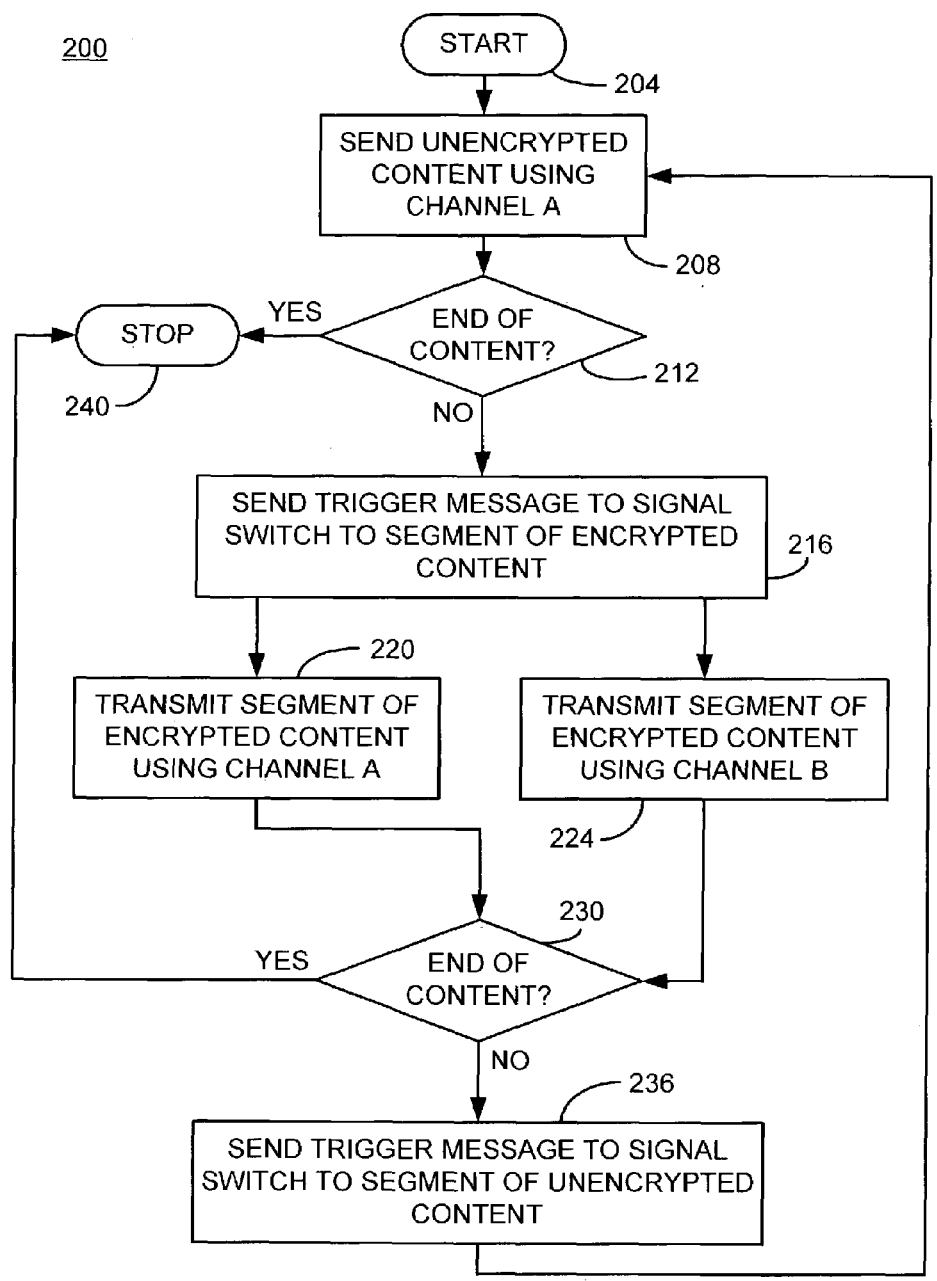
FIG. 3 is a flow chart of a head end encryption process consistent with certain embodiments of the present invention.

The operation of the cable system head end 100 in generating the dual partially encrypted A/V data stream can be described by the process 200 of FIG. 3 starting at 204. Unencrypted content is sent out on channel A of the head end 100 to the cable system 32 at 208. If the end of the content is not reached at 212, a trigger message is sent to the cable network 32 at 216. This trigger message defines a starting time or packet number (and possibly a stopping time or packet number) for encrypted content to begin and further specifies the channel that the next segment of encrypted content will use. The selected segment of content is then dual encrypted (in this example, but multiply encrypted in general) and transmitted using encryption method A and channel A at 220 and using encryption method B and channel B at 224. If the end of the content is not reached at 230, another trigger message (according to the current embodiment in which a stop time or packet number is not defined for the encrypted segment at 216) is generated at 236 indicating that clear content is to follow at a prescribed start time or packet number over channel A. When the end of the content is reached at 212 or 230, the process stops at 240.

In accordance with one embodiment consistent with the present invention, the A/V content can be segmented such that several seconds, e.g., ten seconds, of content is encrypted periodically to encrypt, for example, between 10 and 35 percent of the A/V content. This, however, should not be considered limiting since any desired segmentation can be used to produce segments of encrypted content. In preferred embodiments, encrypted segments last between several seconds and several tens of seconds, but this should not be considered limiting. Due to the nature of MPEG encoding, encryption of certain data such as I Frames and P Frames, or any packet containing intra-coded data, will result in a further scrambling effect on the picture beyond the encrypted segment for any hacker attempting to view the A/V content without authorization. Thus, as the STB's MPEG decoder attempts to recover from loss of data following a segment of encryption, there may be several seconds or longer of content that the decoder cannot reconstruct until the next frame or packet of intra-coded data is received. This results in a greater encryption effect than simply loss of the encrypted segments of A/V content.

Figure 4:
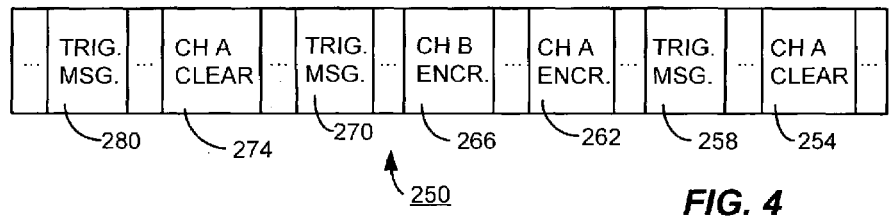
FIG. 4 illustrates a dual encrypted A/V data stream consistent with certain embodiments of the present invention.

The head end 100, thus, produces a stream of A/V data that may resemble data stream 250 shown in FIG. 4. The data stream 250 may start with either a clear or encrypted data stream without limitation. A segment of clear A/V data 254 in the data stream is followed by a trigger message 258 specifying the channel and timing of an encrypted segment to follow. Encrypted segments 262 and 266 follow in any order (but generally intermingled) with encrypted A/V content on channels A and B using encryption methods A and B as previously described. A trigger message 270 indicates that unencrypted content will follow at a specified timing on channel A. This is followed by a segment 274 of clear content on channel A until such time as a next segment is to be encrypted. The next segment of encrypted content is then signaled by trigger message 280 and so on.

Figure 5:
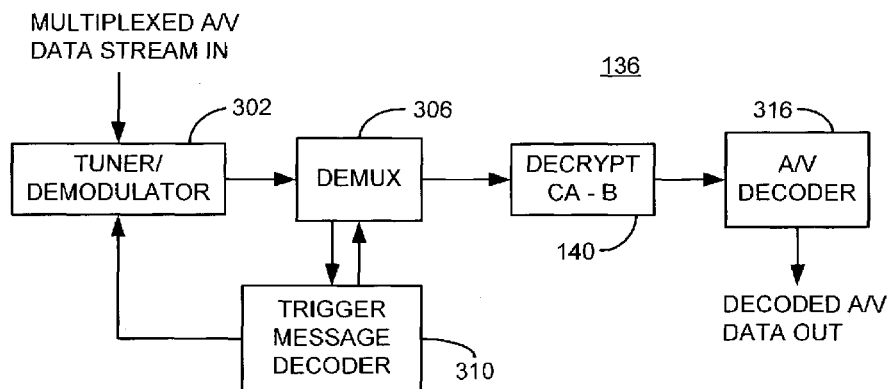
FIG. 5 is a high level block diagram illustrating operation of STB 136 consistent with certain embodiments of the present invention.

Upon receipt of a data stream such as stream 250, STB 136 operates as illustrated in the block diagram of FIG. 5. The multiplexed A/V data stream from multiplexer 110 which is generally quadrature amplitude modulated (QAM) is received at a tuner/demodulator 302 that tunes to the appropriate carrier frequency and demodulates the QAM signal into a stream of packets. This stream of packets is delivered to a demultiplexer 306 that selects appropriate packets for further processing (Note that the stream of packets may include multiple channels and multiple programs as well as other data packets.). When the demultiplexer detects a trigger message (which may be a part of the Program Specific Information encoded as user private data, this packet is delivered to a control processor that incorporates a trigger message decoder 310 in one embodiment. In other embodiments, the trigger message decoder may be implemented in any other suitable manner.

The trigger message decoder 310 decodes the trigger message to determine when the change between encrypted and unencrypted content will occur and what channel will bear each. The trigger message decoder 310 then instructs the demultiplexer 306 to tune to a specified Packet identifier (PID), and if necessary, to tune the tuner/demodulator 302 to a different frequency channel at the appropriate time to receive and decode the next segment of content.

The content is delivered to decrypter 140 which passes unencrypted packets unaltered and decrypts the encrypted packets when they are encountered. The content is then passed to an A/V decoder 316 that decodes the content into decoded A/V data (in either analog or digital form as desired) to the television receiver 144.

Figure 6:
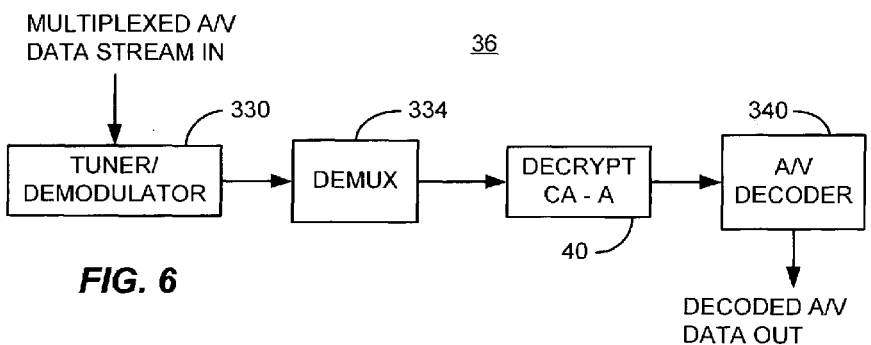
FIG. 6 is a high level block diagram illustrating operation of STB 36 consistent with certain embodiments of the present invention.

The operation of legacy STB 36 is depicted in the block diagram of FIG. 6. Tuner/demodulator 330 operates on the multiplexed data stream in a manner similar to that of 302 to tune and demodulate the incoming signal. This signal is then demultiplexed at demultiplexer 334 to select the appropriate channel (channel A). This demultiplexed output is then passed to decrypter 40 which decrypts encrypted packets and passes unencrypted packets undisturbed to the A/V decoder 340. A/V decoder 340 operates in a manner similar to that of A/V decoder 316 to produce decoded A/V output.

Figure 7:
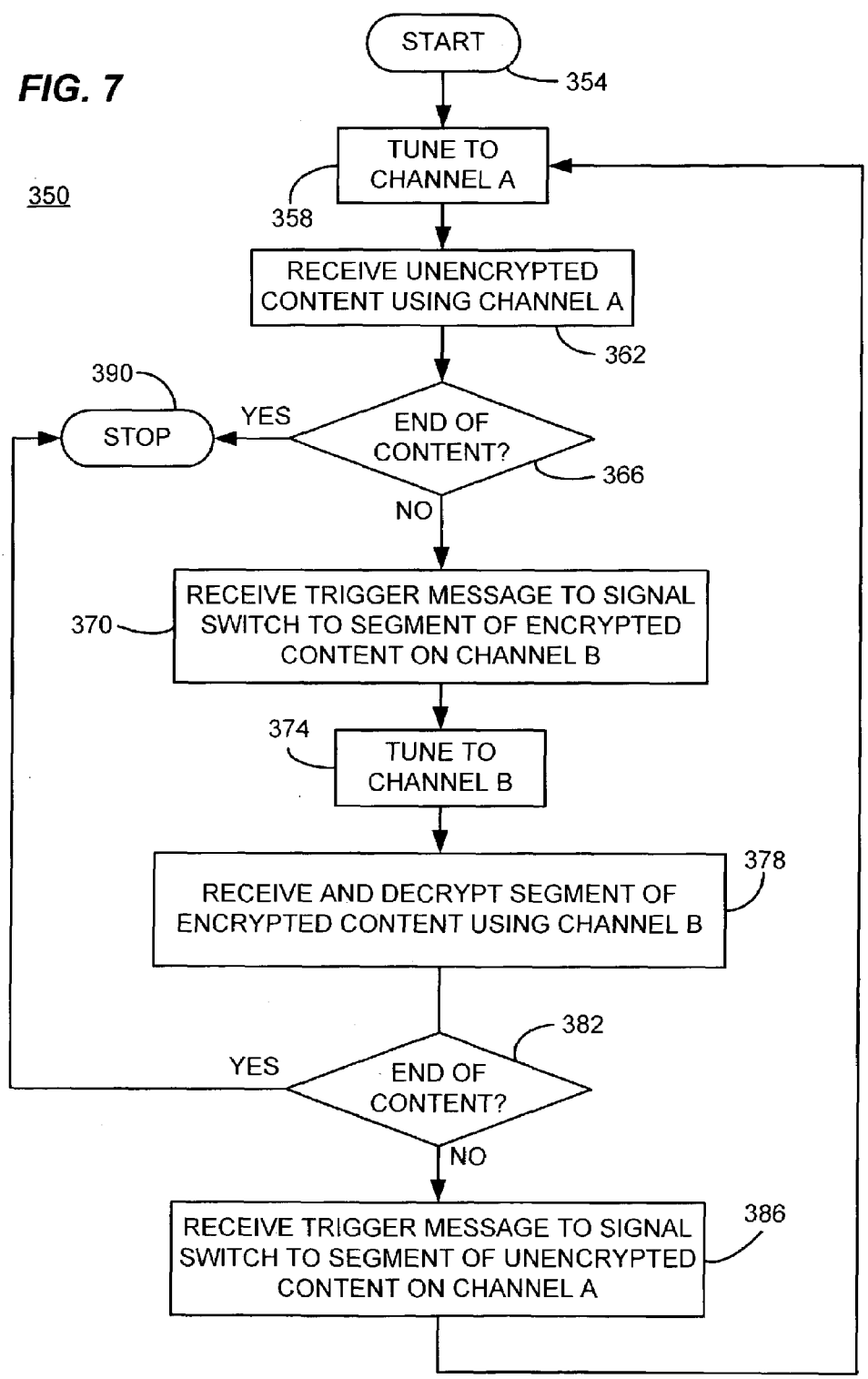
FIG. 7 is a flow chart of a process for decoding and decrypting A/V content in a manner consistent with certain embodiments of the present invention.

Turning now to FIG. 7, a process 350 for decoding a data stream at STB 136 consistent with certain embodiments of the invention is depicted in flow chart form starting at 354. At 358 the STB tunes to channel A (which may involve a tuning process in the STB's tuner as well as selection of a particular set of audio and video PIDs) associated with a particular program. Unencrypted content is then received at 362 using channel A in the illustrated embodiment (but encrypted content could equally well be received first). If the end of the content is not reached at 366, a trigger message can be received at 370 signaling a switch to a new channel B to receive a segment of encrypted content at a prescribed time or packet number. At an appropriate time, the STB 136 then tunes to channel B at 374 to begin receiving and decrypting the content on channel B at 378. If the end of the content is not received at 382, another trigger message may be received to signal a switch to unencrypted content on channel A (or another channel such as channel C) at 386. Control then returns to 358 where the STB 136 tunes to the new channel to receive unencrypted content at the prescribed time. When the end of the content is received at either 366 or 382, control passes to 390 where the process stops.

Figure 8:
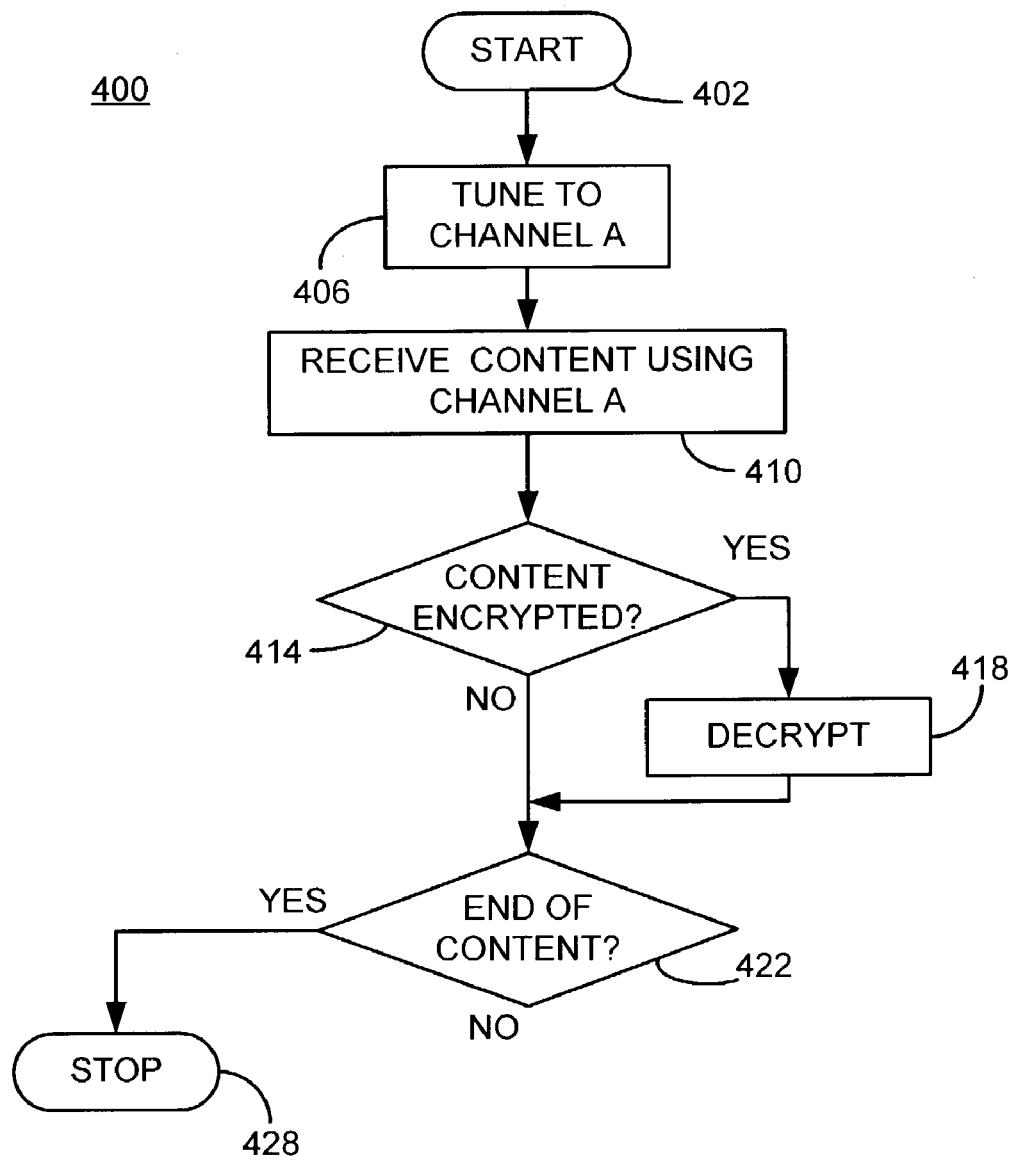
FIG. 8 is a flow chart of a process for decoding and decryption of A/V content in a legacy STB consistent with certain embodiments of the present invention.

Operation of a legacy STB such as 36 is depicted by process 400 of FIG. 8 starting at 402. At 406, the STB 36 tunes to channel A to receive a selected program and begins receiving content over channel A at 410. Any trigger messages received are ignored at STB 36. If the content is encrypted at 414, control passes to 418 where the content is decrypted. If the content is not encrypted at 414, the data are passed without alteration at 414 by the decrypter directly to 422 from 414. When the end of the content is reached at 422, the process stops at 428.

While the process 400 depicted in connection with operation of legacy STB 36 is the normally contemplated process, it is also possible to direct trigger messages to the legacy STB 36 to cause a channel change for encrypted or unencrypted content, rendering the content more difficult for a hacker to obtain without authorization. Similarly, channel changes for the encrypted and unencrypted content can be made to make reception by a hacker more difficult is contemplated in connection with the operation of STB 136.

Also, in a variation of the present invention a return to the primary (i.e., unencrypted) channel could be accomplished by use of a timer such that the trigger signal that signals a channel change from the first segment to the second segment can incorporate a duration field that determines when a change back to the primary channel is to occur. Other variations will occur to those skilled in the art upon consideration of the present disclosure.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of partially dual encrypting an unencrypted digital video signal representing a video program, comprising:
    transmitting a first segment of the digital video signal as an unencrypted digital video signal using a first channel;
    transmitting a trigger message indicating that a second segment of the digital video signal will be encrypted and will appear on a second channel;
    duplicating the second segment to produce first and second copies of the second segment;
    encrypting the first copy of the second segment under a first encryption method to produce a first encrypted segment;
    encrypting the second copy of the second segment under a second encryption method to produce a second encrypted segment;
    transmitting the first encrypted segment over the first channel; and
    transmitting the second encrypted segment over the second channel.

2. The method according to claim 1, wherein the first channel is associated with a first packet identifier (PID) and the second channel is associated with a second packet identifier.

3. The method according to claim 1, wherein the first channel is associated with a first frequency and the second channel is associated with a second frequency.

4. The method according to claim 1, wherein the trigger message comprises a part of a program specific information (PSI) message.

5. The method according to claim 4, wherein the trigger message is encoded as user specific information within the PSI message.

6. The method according to claim 1, wherein the trigger message contains a starting time for the second segment of digital video signal.

7. The method according to claim 1, wherein the trigger message contains a starting packet number for the second segment of digital video signal.

8. The method according to claim 1, further comprising transmitting segments of unencrypted digital video alternating with duplicated segments of encrypted digital video, with the duplicated encrypted digital video being encrypted under the first and second encryption methods.

9. The method according to claim 8, wherein each of the duplicated encrypted digital video comprises between approximately 10% and 35% of the total digital video signal.

10. The method according to claim 1, further comprising transmitting a second trigger message indicating that a third segment of the digital video signal will be unencrypted and will appear on a specified channel.

11. The method according to claim 10, wherein the specified channel comprises the first channel.

12. The method according to claim 10, wherein the specified channel comprises a third channel.

13. A computer readable medium storing instructions which, when executed on a programmed processor, carry out the method of encrypting a digital video signal according to claim 1.

14. The computer readable medium of claim 13, wherein the medium comprises an electronic storage medium.

15. A partial dual encryption encoder, comprising:
a source of an unencrypted digital video signal representing a video program;
means for selecting a first segment of the unencrypted digital video signal for transmission over a first channel;
a first encrypter that encrypts a second segment of the unencrypted digital video signal under a first encryption method to produce a first encrypted segment;
a second encrypter that encrypts the second segment of the unencrypted digital video signal under a second encryption to produce a second encrypted segment;
a multiplexer that combines the unencrypted digital video signal with the first and second encrypted segments for transmission, so that the first segment is transmitted over a first channel, the first encrypted segment is transmitted over the first channel and the second encrypted segment is transmitted over a second channel;
a trigger message generator that generates a trigger message indicating that the second encrypted segment of the digital video signal will be encrypted and will be transmitted on a second channel; and
wherein, the multiplexer further combines the trigger message with the first segment, the first encrypted segment and second encrypted segment.

16. The partial dual encryption encoder according to claim 15, wherein the first channel is associated with a first packet identifier (PID) and the second channel is associated with a second packet identifier.

17. The partial dual encryption encoder according to claim 15, wherein the first channel is associated with a first frequency and the second channel is associated with a second frequency.

18. The partial dual encryption encoder according to claim 15, wherein the trigger message comprises a part of a program specific information (PSI) message.

19. The partial dual encryption encoder according to claim 18, wherein the trigger message is encoded as user specific information within the PSI message.

20. The partial dual encryption encoder according to claim 15, wherein the trigger message contains a starting time for the second segment of digital video signal.

21. The partial dual encryption encoder according to claim 15, wherein the trigger message contains a starting packet number for the second segment of digital video signal.

22. The partial dual encryption encoder according to claim 15, further comprising transmitting segments of unencrypted digital video alternating with duplicated segments of encrypted digital video, with the duplicated encrypted digital video being encrypted under the first and second encryption methods.

23. The partial dual encryption encoder according to claim 22, wherein each of the duplicated encrypted digital video comprises between approximately 10% and 35% of the total digital video signal.

24. The partial dual encryption encoder according to claim 15, further comprising transmitting a second trigger message indicating that a third segment of the digital video signal will be unencrypted and will appear on a specified channel.

25. The partial dual encryption encoder according to claim 24, wherein the specified channel comprises the first channel.

26. The partial dual encryption encoder according to claim 24, wherein the specified channel comprises a third channel.

27. A partial encryption encoder, comprising:
a source of an unencrypted digital video signal representing a video program;
means for selecting a first segment of the unencrypted digital video signal for transmission over a first channel;
an encrypter that encrypts a second segment of the unencrypted digital video signal under a first encryption method to produce a second encrypted segment;
a multiplexer that combines the unencrypted digital video signal with the second encrypted segment for transmission, so that the first segment is transmitted over a first channel and the second encrypted segment is transmitted over a second channel;
a trigger message generator that generates a trigger message indicating that the second encrypted segment of the digital video signal will be encrypted and will be transmitted on a second channel; and
wherein, the multiplexer further combines the trigger message with the first segment and second encrypted segment.

28. The partial encryption encoder according to claim 27, wherein the first channel is associated with a first packet identifier (PID) and the second channel is associated with a second packet identifier.

29. The partial encryption encoder according to claim 27, wherein the first channel is associated with a first frequency and the second channel is associated with a second frequency.

30. The partial encryption encoder according to claim 27, wherein the trigger message comprises a part of a program specific information (PSI) message.

31. The partial encryption encoder according to claim 30, wherein the trigger message is encoded as user specific information within the PSI message.

32. The partial encryption encoder according to claim 27, wherein the trigger message contains a starting time for the second segment of digital video signal.

33. The partial encryption encoder according to claim 27, wherein the trigger message contains a starting packet number for the second segment of digital video signal.

34. The partial encryption encoder according to claim 27, further comprising transmitting segments of unencrypted digital video alternating with segments of encrypted digital video.

35. The partial encryption encoder according to claim 34, wherein the encrypted digital video comprises between approximately 10% and 35% of the total digital video signal.

36. The partial encryption encoder according to claim 30, further comprising transmitting a second trigger message indicating that a third segment of the digital video signal will be unencrypted and will appear on a specified channel.

37. The partial encryption encoder according to claim 36, wherein the specified channel comprises the first channel.

38. The partial encryption encoder according to claim 36, wherein the specified channel comprises a third channel.

39. A method of decrypting a partially multiple encrypted digital video signal representing a video program, comprising:
   receiving a first unencrypted segment of the digital video signal as an unencrypted digital video signal over a first channel;
   receiving a trigger message indicating that a second segment of the digital video signal will be encrypted and transmitted over a second channel;
   tuning to the second channel;
   receiving the second encrypted segment over the second channel;
   wherein, the second segment of the digital video signal is also received in an encrypted form that cannot be decrypted by an available decrypter over the first channel;
   decrypting the second encrypted segment using the available decrypter; and
   combining the decrypted second encrypted segment and the first unencrypted segment to assemble the digital video signal.

40. The method according to claim 39, wherein the first channel is associated with a first packet identifier (PID) and the second channel is associated with a second packet identifier.

41. The method according to claim 39, wherein the first channel is associated with a first frequency and the second channel is associated with a second frequency.

42. The method according to claim 39, wherein the trigger message comprises a part of a program specific information (PSI) message.

43. The method according to claim 42, wherein the trigger message is encoded as user specific information within the PSI message.

44. The method according to claim 39, wherein the trigger message contains a starting time for the second segment of digital video signal.

45. The method according to claim 39, wherein the trigger message contains a starting packet number for the second segment of digital video signal.

46. The method according to claim 39, further comprising receiving segments of unencrypted digital video alternating with segments of encrypted digital video.

47. The method according to claim 46, wherein the encrypted digital video comprises between approximately 10% and 35% of the total digital video signal.

48. A tangible computer readable storage medium carrying instructions which, when executed on a programmed processor, carry out the method of decrypting a digital video signal according to claim 39.

49. The tangible computer readable storage medium of claim 48, wherein the storage medium comprises an electronic storage medium.

50. A partial encryption decoder for decoding and decrypting a partially encrypted digital video signal representing a video program, comprising:
   a receiver that receives a first unencrypted segment of the digital video signal as an unencrypted digital video signal over a first channel and receives a second encrypted segment over a second channel;
   a trigger message decoder that receives and decodes a trigger message indicating that a second segment of the digital video signal will be encrypted and transmitted over a second channel, the decoder causing the receiver to tune to the second channel for receipt of the second encrypted segment;
   a decrypter that receives and decrypts the second encrypted segment;
   wherein, the second segment of the digital video signal is also received by the receiver in an encrypted form that cannot be decrypted by the decrypter over the first channel; and
   means for combining the decrypted second encrypted segment and the first unencrypted segment to assemble the digital video signal.

51. The partial encryption decoder according to claim 50, wherein the first channel is associated with a first packet identifier (PID) and the second channel is associated with a second packet identifier.

52. The partial encryption decoder according to claim 50, wherein the first channel is associated with a first frequency and the second channel is associated with a second frequency.

53. The partial encryption decoder according to claim 50, wherein the trigger message comprises a part of a program specific information (PSI) message.

54. The partial encryption decoder according to claim 53, wherein the trigger message is encoded as user specific information within the PSI message.

55. The partial encryption decoder according to claim 50, wherein the trigger message contains a starting time for the second segment of digital video signal.

56. The partial encryption decoder according to claim 50, wherein the trigger message contains a starting packet number for the second segment of digital video signal.

57. The partial encryption decoder according to claim 50, further comprising receiving segments of unencrypted digital video alternating with segments of encrypted digital video.

58. The partial encryption decoder according to claim 57, wherein the encrypted digital video comprises between approximately 10% and 35% of the total digital video signal.

59. A television set-top box, comprising: p1 A receiver receiving a digital television signal representing a television program comprising:
   a plurality of unencrypted packets received over a first channel;
   a plurality of encrypted packets received over the first channel; and
   a plurality of encrypted packets received over a second channel;
   a trigger message decoder that receives and decodes a trigger message indicating that a second segment of the digital video signal will be encrypted and transmitted over a second channel, the decoder causing the receiver to tune to the second channel for receipt of the second encrypted segment;
   a decrypted that decrypts the encrypted packets received over the second channel, but which is unable to decrypt the encrypted packets received over the first channel, wherein either of the encrypted packets received over either the first or second channel together with the plurality of unencrypted packets can be used to reconstitute the digital television signal representing the television program; and
   a decoder that decodes the unencrypted packets and the decrypted packets to produce the digital television signal representing the television program suitable for play on a television set.

60. A computer readable storage medium storing instructions that when executed on a programmed processor facilitates operations of a video receiver device to decrypt a selectively encoded digital video signal, wherein the instructions comprise:

a code segment that controls a receiver that receives a first unencrypted segment of the digital video signal as an unencrypted digital video signal over a first channel and receives a second encrypted segment over both the first channel and a second channel;

a code segment that controls a trigger message decoder that receives and decodes a trigger message indicating that a second segment of the digital video signal will be encrypted and transmitted over a second channel, the decoder causing the receiver to tune to the second channel for receipt of the second segment; and a code segment that controls a decrypted that receiver and decrypts the second encrypted segment, wherein the decrypted is unable to decrypt the second encrypted segment received over the first channel.

61. The computer readable medium of claim 60, wherein the medium comprises an electronic storage medium.

* * * * *

UNITED STATES PATENT AND TRADEMARK OFFICE
CERTIFICATE OF CORRECTION

PATENT NO. : 7,242,773 B2 Page 1 of 1
APPLICATION NO. : 10/273904
DATED : July 10, 2007
INVENTOR(S) : Brant L. Candelore It is certified that error appears in the above-identified patent and that said Letters Patent is hereby corrected as shown below:

Claims:

In col. 12, line 38, delete "p1 A", and insert -- a -- therefor.

In col. 14, line 3, delete "second segment" and insert --second encrypted segment -- therefor.

In col. 14, line 4, delete "decrypted that receiver" and insert --decrypter that receives -- therefor.

In col. 14, line 6, delete "decrypted" and insert --decrypter-- therefor.

Signed and Sealed this

Twenty-seventh Day of November, 2007

JON W. DUDAS
*Director of the United States Patent and Trademark Office*